US011250878B2

(12) United States Patent
Xiang et al.

(10) Patent No.: US 11,250,878 B2
(45) Date of Patent: Feb. 15, 2022

(54) SOUND CLASSIFICATION SYSTEM FOR HEARING AIDS

(71) Applicant: Starkey Laboratories, Inc., Eden Prairie, MN (US)

(72) Inventors: JuanJuan Xiang, Eden Prairie, MN (US); Martin McKinney, Minneapolis, MN (US); Kelly Fitz, Eden Prairie, MN (US); Tao Zhang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 47 days.

(21) Appl. No.: 16/741,114

(22) Filed: Jan. 13, 2020

(65) Prior Publication Data

US 2020/0152227 A1 May 14, 2020

Related U.S. Application Data

(63) Continuation of application No. 12/879,218, filed on Sep. 10, 2010, now abandoned.
(Continued)

(51) Int. Cl.
*G10L 21/02* (2013.01)
*G10L 25/78* (2013.01)
(Continued)

(52) U.S. Cl.
CPC ............ *G10L 25/78* (2013.01); *H04R 25/505* (2013.01); *G10L 15/142* (2013.01); *G10L 2025/783* (2013.01); *H04R 25/507* (2013.01)

(58) Field of Classification Search
CPC . G10L 21/0208; G10L 21/0216; G10L 25/78; G10L 25/81; G10L 21/02; G10L 21/00; G10L 21/003; G10L 21/007; G10L 21/0232; G10L 21/0264; G10L 21/0308; G10L 21/0364; G10L 2021/0575; G10L 2021/065; H04R 2460/01; H04R 25/507
(Continued)

(56) References Cited

U.S. PATENT DOCUMENTS

| 5,727,072 A | 3/1998 | Raman |
| 6,067,517 A | 5/2000 | Bahl et al. |

(Continued)

FOREIGN PATENT DOCUMENTS

| EP | 2136358 | 12/2009 |
| EP | 1835785 | 9/2013 |

(Continued)

OTHER PUBLICATIONS

Alexandre et al., "Feature Selection for Sound Classification in Hearing Aids Through Restricted Search Driven by Genetic Algorithms," IEEE Transactions on Audio Speech, and Language Processing, Nov. 2007, pp. 2249-2256. (Year: 2007).*

(Continued)

*Primary Examiner* — Qi Han
(74) *Attorney, Agent, or Firm* — Mueting Raasch Group

(57) ABSTRACT

A hearing aid includes a sound classification module to classify environmental sound sensed by a microphone. The sound classification module executes an advanced sound classification algorithm. The hearing aid then processes the sound according to the classification.

21 Claims, 6 Drawing Sheets

Related U.S. Application Data

(60) Provisional application No. 61/241,735, filed on Sep. 11, 2009.

(51) Int. Cl.
*H04R 25/00* (2006.01)
*G10L 15/14* (2006.01)

(58) Field of Classification Search
USPC ........ 704/200, 205, 206, 226, 233, 245, 255
See application file for complete search history.

(56) References Cited

U.S. PATENT DOCUMENTS

| | | | |
|---|---|---|---|
| 6,182,036 | B1 | 1/2001 | Poppert |
| 6,240,386 | B1 | 5/2001 | Thyssen et al. |
| 6,570,991 | B1 * | 5/2003 | Scheirer ............... G10H 1/00 381/110 |
| 6,708,146 | B1 * | 3/2004 | Sewall .................. G10L 25/78 704/214 |
| 6,862,359 | B2 | 3/2005 | Nordqvist et al. |
| 7,082,394 | B2 | 7/2006 | Burges et al. |
| 7,509,259 | B2 | 3/2009 | Song |
| 7,693,806 | B2 | 4/2010 | Yih et al. |
| 8,019,593 | B2 | 9/2011 | Weng et al. |
| 8,045,739 | B2 | 10/2011 | Paludan-Mueller et al. |
| 8,165,877 | B2 | 4/2012 | Wang et al. |
| 8,170,248 | B2 | 5/2012 | Hersbach et al. |
| 8,442,250 | B2 | 5/2013 | Klinkby |
| 8,948,428 | B2 | 2/2015 | Kates |
| 2006/0182295 | A1 | 8/2006 | Dijkstra et al. |
| 2010/0027820 | A1 * | 2/2010 | Kates .................. H04R 25/505 381/312 |

FOREIGN PATENT DOCUMENTS

| | | | |
|---|---|---|---|
| WO | 2001/076321 | 10/2001 | |
| WO | 2008/028484 | 3/2008 | |
| WO | WO-2008028484 A1 * | 3/2008 | ............ G10L 25/00 |

OTHER PUBLICATIONS

Alexandre et al., "Feature selection for sound classification in hearing aids through restricted search driven by generic algorithms", IEEE Transactions on Audio Speech, and Language Processing, Nov. 2007, pp. 2249-2256.

Alexandre et al., "Sound classification in hearing aids by the harmony search algorithm", Music-Inspired Harmony Search Algorithm, Springer, 2009, pp. 173-188.

Alexandre et al., "Automatic sound classification for improving speech intelligibility in hearing aids using a layered structure", Intelligent Data Engineering and Automated Learning-IDEAL, 2006, pp. 306-313.

Bochler et al., "Sound classification in hearing aids inspired by auditory scene", Eurasip Journal of Applied Signal, Processing, vol. 2005, No. 18, Oct. 15, 2005, pp. 2991-3002.

Burred et al., "Hierarchical automatic audio signal classification", Journal of the Audio Engineering Society, 52.7/8, Jul. 2004, pp. 724-739.

Cuardra et al., "Reducing the computational cost for sound classification in hearing aids by selecting features via genetic algorithms with restricted search", IEEE International Conference on Audio, Language, and Image Processing, Jul. 2008, pp. 1320-1327.

Dong et al., "Low-power implementation of an HMM-based sound environment classification algorithm for hearing aid application", IEEE 15th European Signal Processing Conference, Sep. 2007, pp. 1635-1638.

Freeman et al., "Audio environment classification for hearing aids using artificial neural networks with windowed input", IEEE Proceedings Symposium on Computational Intelligence in Image and Signal Processing, Apr. 2007, pp. 183-188.

Kates, "Classification of background noises for hearing-aid applications", The Journal of the Acoustical Society of America, vol. 97, 1995, pp. 461-470.

Chu et al., "Environmental sound recognition using MP-based features", in Proceedings of IEEE International Conference on Acoustics, Speech, and Signal Processing. 2008, pp. 1-4.

Edwards et al., "Signal-processing algorithms for a new software-based, digital hearing device", Hearing Journal, 1998. 51: pp. 44-54.

Huang et al., "Advances in unsupervised audio classification and segmentation for the broadcast news and NGSW corpora", IEEE Transactions on Audio, Speech, and Language Processing, 2006. 14(3): pp. 907-919.

Lavner et al., "A Decision-Tree based Algorithm for Speech/Music Classification and Segmentation", EURASIP Journal on Audio, Speech, and Music Processing, 2009. 2009.

McKinney et al., "Features for audio and music classification". In Proceedings of International Conference on Music Information Retrieval 2003, pp. 151-158.

Rabiner, "A tutorial on hidden Markov models and selected applications in speech recognition", Proceedings of the IEEE, 1989. 77(2): pp. 257-286.

Scheirer et al., "Construction and evaluation of a robust multifeature speech/music discriminator", in Proceedings of IEEE International Conference on Acoustics, Speech, and Signal Processing. 1997, pp. 1331-1334.

Zhang et al., "Audio content analysis for online audiovisual data segmentation and classification", IEEE Transactions on Speech and Audio Processing, 2001. 9(4): p. 441.

* cited by examiner

SOUND CLASSIFICATION SYSTEM FOR HEARING AIDS

CLAIM OF PRIORITY

The present application is a continuation of U.S. patent application Ser. No. 12/879,218, filed Sep. 10, 2010, which claims the benefit under 35 U.S.C. 119(e) of U.S. Provisional Patent Application Ser. No. 61/241,735, filed Sep. 11, 2009, which are incorporated herein by reference in their entireties.

TECHNICAL FIELD

This document relates generally to hearing aids and more particularly to a sound classification system for hearing aids.

BACKGROUND

Hearing aid users are typically exposed to a variety of listening situations, such as speech, music or noisy environment. To yield the best listening experience for them, the behavior of the instrument, for instance the activation of a directional microphone, or the compression/expansion parameters, should adapt to the currently engaged environment. This indicates the need for sound classification algorithms functioning as a front end to the rest of the signal processing scheme housed in the instruments [1].

SUMMARY

A hearing aid includes a sound classification module to classify environmental sound sensed by a microphone. The sound classification module executes an advanced sound classification algorithm. The hearing aid then processes the sound according to the classification.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Automatic program switching has been shown to be of great beneficial for hearing aids users. This feature is mediated by a sound classification system, which is traditionally implemented using simple features and heuristic classification schemes, resulting in an unsatisfactory performance in a complicated auditory scenario.

Sound classification has been studied under different contexts, such as speech/music discrimination [2, 3], environment sounds classification [4], and content-based audio classification [5, 6]. Compared with these applications, sounds classification in hearing aids is more challenging due to the limited power consumption, the real time operation and the great varieties of sounds encountered in the real life. So far, a couple of simple features and classifier schemes, such as a threshold-based classifier, have been implemented in hearing aids to identify speech, noise and speech in noise [7]. When more kinds of sounds need to be classified, advanced classifiers and features are needed to achieve a satisfactory performance. The present sound classification system provides a hearing aid with such advanced classifiers and features. In this document, results of a systemic evaluation of the present sound classification system, including the impact of sophisticated features and classifiers on the classification rate, computational cost and classification delay are presented. The classification system which is intended to detect speech, music and several kinds of noises is constructed. The performance of two feature sets, including both low level features and Mel-scale Frequency cepstral coefficients (MFCC), are compared by applying Gaussian classifiers, Hidden Markov Model (HMM), and Gaussian Mixture Model (GMM) individually.

Figure 1:
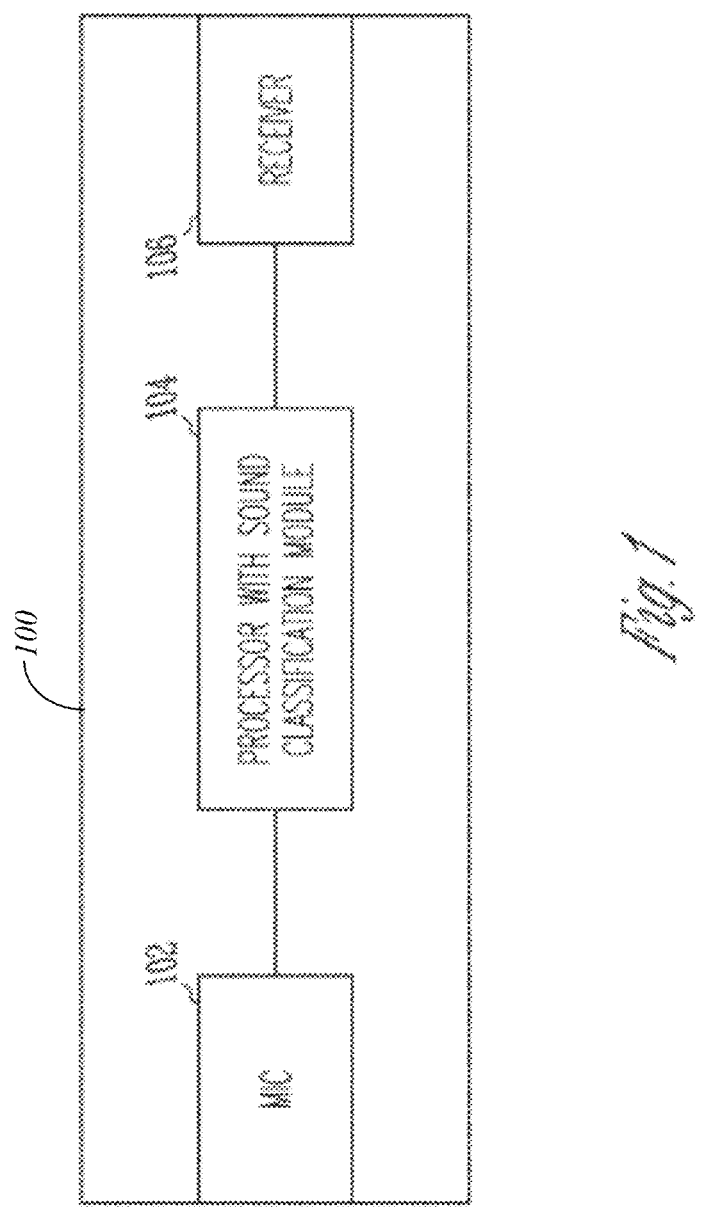
FIG. 1 is a block diagram illustrating an embodiment of a hearing aid including a processor with a sound classification module.

FIG. 1 is a block diagram illustrating an embodiment of a hearing aid 100. Hearing aid 100 includes a microphone 102, a processor 104, and a receiver 106. Microphone 102 senses an environmental sound. Processor 104 includes a sound classification module that classifies the sensed sound by executing an advanced classification algorithm. Examples of the advanced classification algorithm include HMM and GMM. Processor 104 processes the sound using an outcome of the classification of the sound for specified hearing assistance functions. Receiver 106 transmits the processed sound for perception by the hearing aid user.

The sound classification module uses a two-stage environment classification scheme. The signal is first classified as music, speech or non-speech. Then the non-speech sounds are further characterized as machine noise, wind noise or other sounds. At each stage, the classification performance and the associated computational cost are evaluated along three dimensions: the choice of classifiers, the choice of feature sets and number of features within each feature set. Each component is further discussed below.

Choosing appropriate features to be implemented in the sound classification module is a domain-specific question.

Based on previous work [1-3, 8], the sound classification module includes one of two feature groups, specifically a low level feature set, and MFCCs. The former consists of both temporal and spectral features, such as zero crossing rate, short time energy, spectral centroid, spectral bandwidth, spectral roll-off, spectral flux, high/low energy ratio, etc. The logarithms of these features are included in the set as well. The first 12 coefficients are included in the MFCC set [9]. There are some other features proposed in literature, such as cepstral modulation ratio [10] and several psycho-acoustic features [8, 11]. These features are not investigated here either due to their high computational cost or because the calculation of these features is not well defined.

Within each set, some features may be redundant or noisy or simply have weak discriminative capability. To identify optimal features, a forward sequential feature selection algorithm is employed [12]. It is noteworthy that the derived feature set is specific to the choice of classifiers, which are discussed in the following section.

Many pattern-recognition techniques have been proposed and used in various fields. However, for hearing aids application, it is often beneficial to keep computational cost low. For this purpose, this study focuses on three classification algorithms: a quadratic Gaussian classifier, a GMM with 5 components, and an ergodic HMM with 5 states and 5 components [13]. The feature selection algorithm is performed for each classifier. The training of GMM and HMM is carried out using the expectation-maximization (EM) algorithm and in the test phase the decision is made based on the Viterbi decoder [14]. To examine the robustness of performance for a given combination of classifiers and features, a 4-fold cross-validation testing procedure is employed to determine the average classification rate [13].

The evaluation of the sound classification module is performed on a database composed of sounds from five classes: music, speech, wind noise, machine noise and others. The music content is taken from a database collected by Scheirer and Slaney [3], which contains 80 15-seconds long audio music samples covering different genres, such as classical music, rock and pop songs, folk music, etc. The remaining samples are recordings made by the authors. The acoustic signals from a variety of auditory scenes are picked up by a microphone located in a BTE hearing aid first and then are stored in a Sony TCD-D8 DAT recorder with a 16-bit resolution and a 48 kHz sampling frequency. The recordings are manually divided according to recording environment and then segmented using a short-term energy detector, followed by manual verification and adjustment of the segment boundaries. The resulting segments are used for training and testing the classification system.

The class "speech" includes both clean and noisy speech. The clean speech comprise of speech spoken by different peoples at different reverberation situations, such as a living room or a cafeteria. The noisy speech is generated by mixing randomly selected files from the clean speech class with noise at three levels of SNR: −6 dB, 0 dB and 6 dB. The class "machine noise" contains the noise generated by various machineries, such as automobile, vacuum and blender. The class "others" is the most varying category comprising any sounds that are not suitably described by the other three classes, for instance the sounds from water running, foot stepping, etc. The duration of the samples of each class is listed in Table 1.

TABLE 1 list of the recorded sound types and their length of durations.

| | Sound Type | | | | |
|---|---|---|---|---|---|
| | Music | Speech | Machine Noise | Wind Noise | Others |
| Duration | 14 | 40 | 73 | 12 | 22 |

Computational cost is a critical constraint concerning the application of various classification algorithms in hearing aids, mainly due to the limitation on power consumption and real time operation. The cost of a classification algorithm consists of two parts, feature evaluation and classification. The former is related with the length of analysis window and the resolution of the Fourier Frequency Transform (FFT), while the latter is mainly determined by the number of sound classes, the dimension of the employed feature vector. For a GMM and HMM classifier, the number of components and states affect the computational cost as well. At each classification stage, the computational cost is measured in terms of number of operations and evaluated along three dimensions: choice of models, choice of feature sets, and number of selected features, just as in the performance evaluation.

Figure 2:
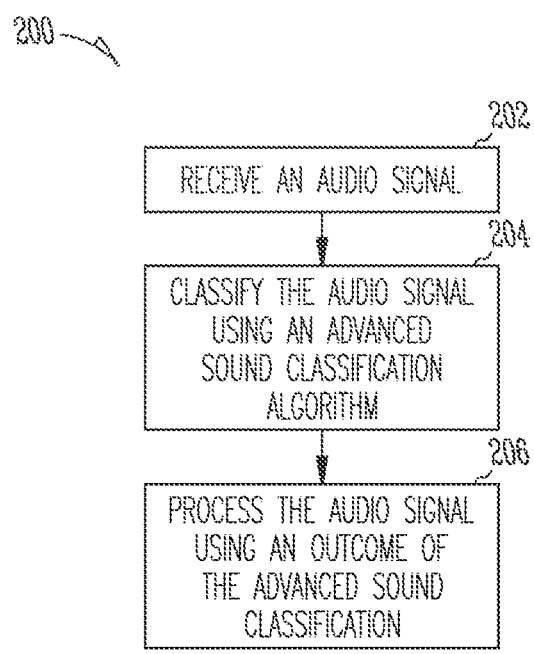
FIG. 2 is a block diagram illustrating an embodiment of a method for operating a hearing aid including an advanced sound classification function.

FIG. 2 is a block diagram illustrating an embodiment of a method 200 for operating a hearing aid including an advanced sound classification function. In one embodiment, method 200 is applied to operate hearing aid 100.

At 202, an environmental sound is sensed. At 204, the sensed sound is classified by executing an advanced classification algorithm. At 206, the sound is processed using an outcome of the classification of the sound for specified hearing assistance functions.

As discussed above, experiments were conducted to systematically assess the impact of more sophisticated classifiers and features on the performances of the sound classification system. The results show that using advanced models, such as HMM or GMM, significantly improve the classification performance. This change does not inevitably lead to a great increase of computational complexity, provided that a suitable number (5 to 7) of low level features are carefully chosen. These findings, thus, indicate that the use of these advanced models is feasible in a hearing aid application.

Figure 3:
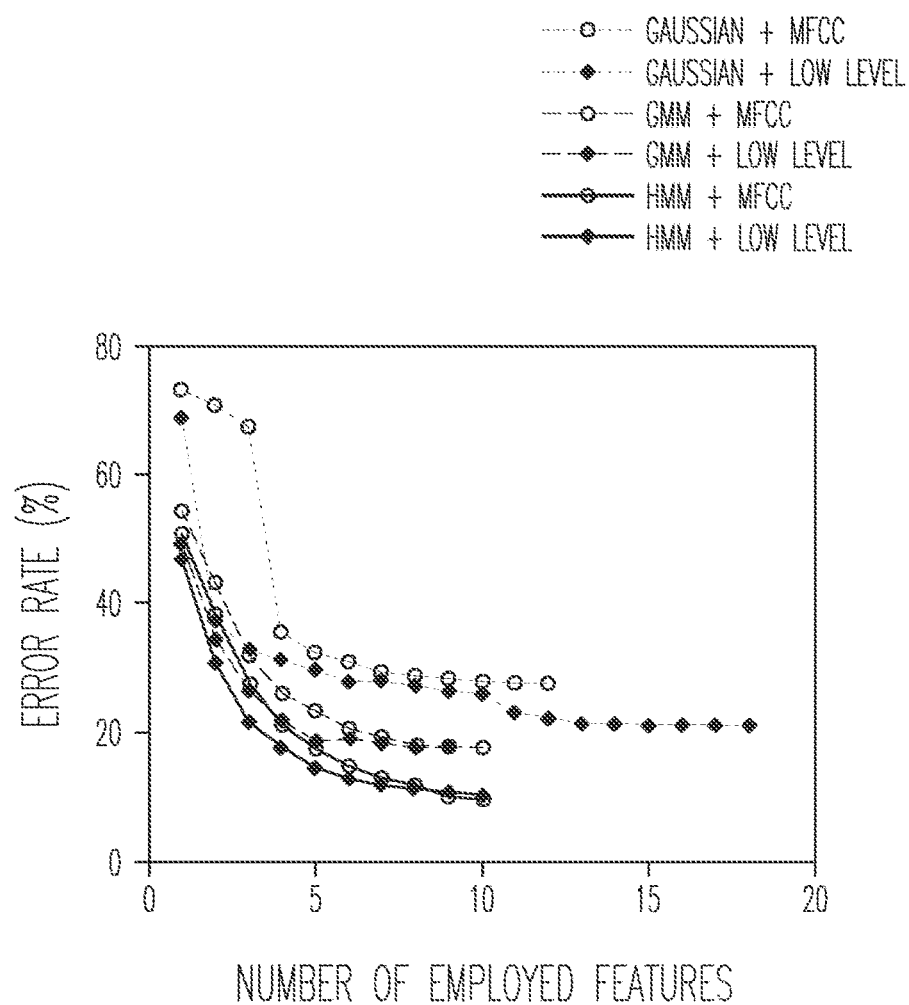
FIG. 3 is a graph showing performance of sound classification including error rate plotted as a function of the number of employed features.

The evaluation performed at each stage is combined to obtain the overall classification rate, which is illustrated in FIG. 3, which is a graph showing error rates each plotted as a function of the number of employed features. The performance is evaluated over two feature sets (low level and MFCC) and three models (Gaussian, GMM and HMM). The error rate obtained at each iteration of the forward sequential feature selection process is plotted. The various classifiers and feature sets are indicated by line styles and marker styles, respectively.

Several results are apparent upon examination of FIG. 3. The first is that advanced models perform better on average than a simple one. When ten features are employed, the lowest error rate of the Gaussian classifier is 26%, while using GMM and HMM, the rates drop to around 18% and 12%, respectively. The performance improvement associated with the employment of GMM might be explained by the better fitting between the distribution of feature vectors and the model. And the further improvement of HMM might be related with its exploration on the dynamics of the feature vectors.

In terms of the feature set, we observe that there is no significant difference in classification performance between the low level feature set and MFCC, provided that the number of employed features is more than five in both cases. This demonstrates that a carefully chosen low level feature subset has discriminative capability equivalent to that of the MFCC. Considering that the computational cost of a low level features-based classification is typically one magnitude lower than a MFCC-based one, the low level features are in favor when the computational source is tight.

Figure 4:
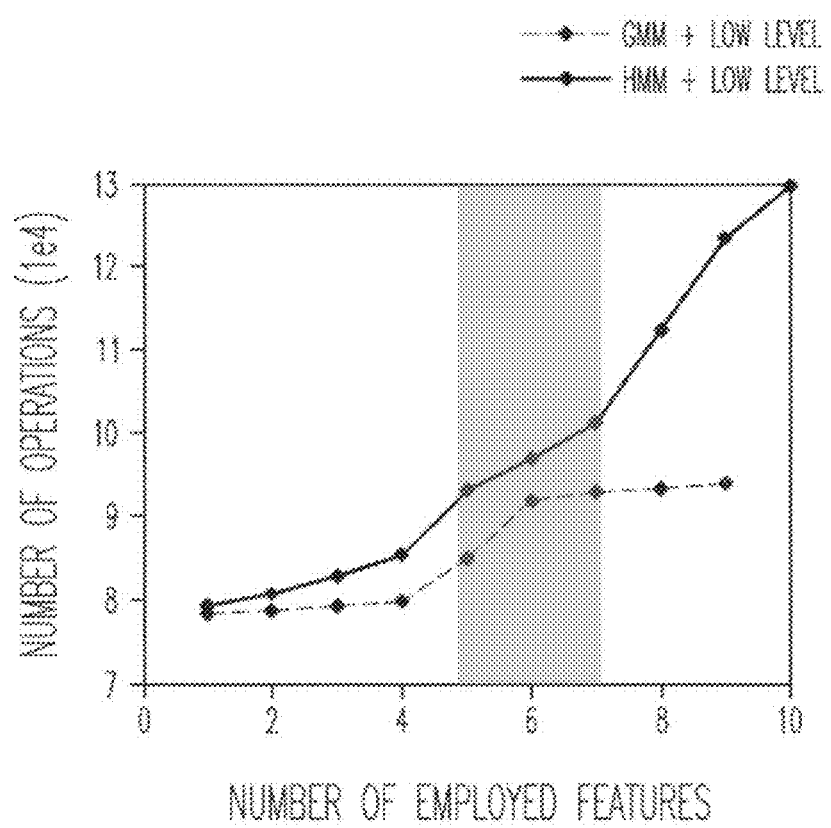
FIG. 4 is a graph showing performance of sound classification including computational cost plotted as a function of the number of employed features.

The discussion above shows the advantage for using advanced models with low level features. Therefore, the following discussion focuses on the advanced models with low level features. The impact of the number of features employed is examined. The overall computational cost is determined from the two stages, as shown in FIG. 4. FIG. 4 is a graph showing performance of sound classification including computational costs each plotted as a function of the number of employed features. The performance is evaluated over advanced models (GMM and HMM) and low level. The recommended number of features is indicated in FIG. 4 by a gray patch. It is noteworthy that when combining the computational cost from the two stages, some features are identified as optimal features on both stages but need only be calculated once. Thus the overall cost is less than the direct summation over the two stages.

A comparison between FIG. 3 and FIG. 4 shows that the increased number of features results both decreased error rates and increased associated computational costs, thus indicating a conflict between performance and computational complexity. It seems that choosing five to seven features is a reasonable comprise between the two factors. Using this number of features, the error rate is about 10% and the computational cost is still manageable. On the other hand, using more than seven features only slightly improves the performance but incurs great computational cost.

Figure 5:
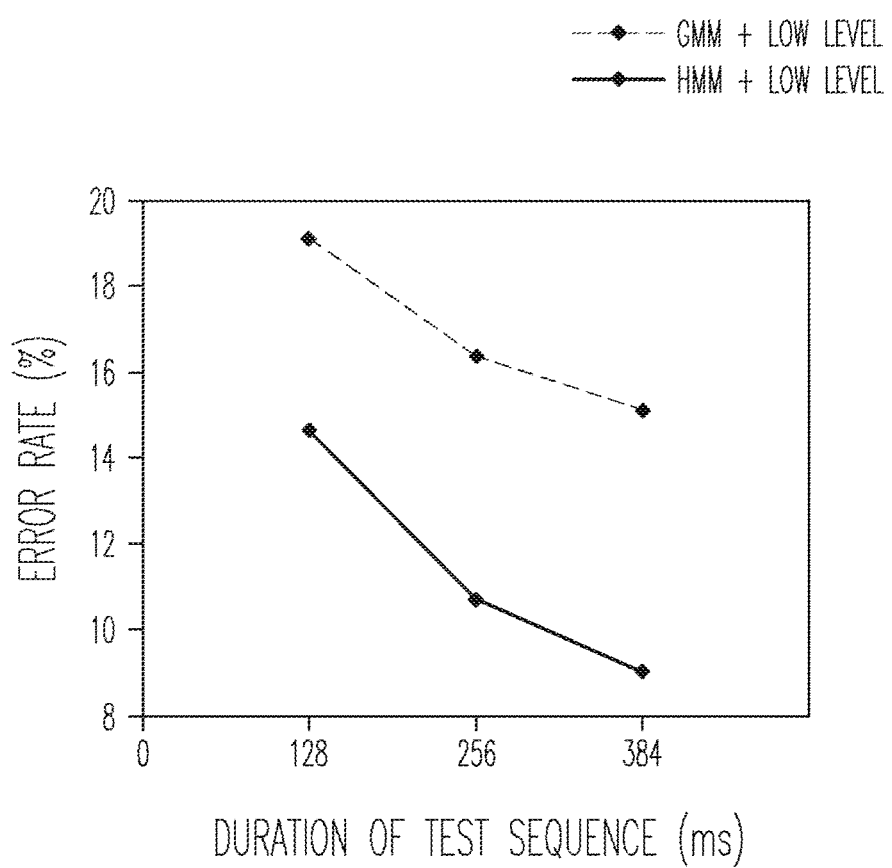
FIG. 5 is a graph showing performance of sound classification including error rate plotted as a function of the length of test sequence.

The impact of the test sequence length on performance when using low level features and advanced models is also examined. The error rates are each plotted as a function of the test sequence length in FIG. 5. The performance is evaluated over advanced models and low level feature set. As expected, increasing the length of test sequence improves the classification performance. An approximate 20% decrease of error rate is obtained by increasing the test sequence from 128 ms to 256 ms. This benefit is diminished with further increase in the length of the test sequence. The overall pattern of the rate of decrease seems to be consistent across classifiers.

Figure 6:
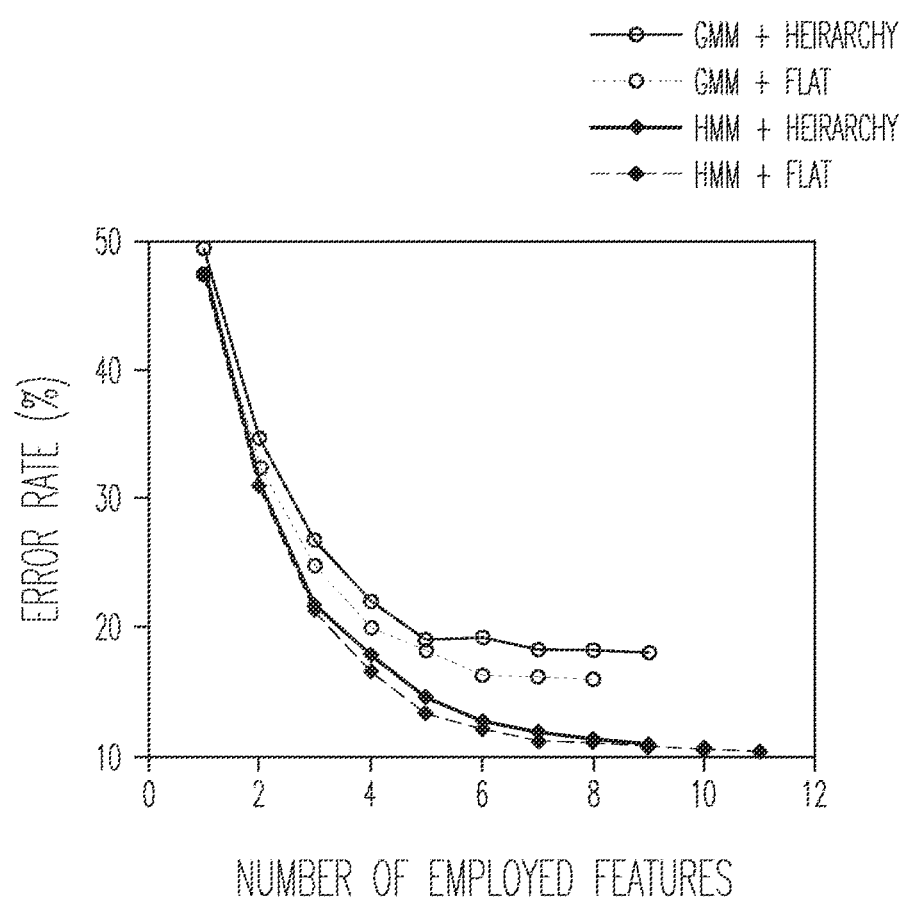
FIG. 6 is a graph showing performance of sound classification including error rate plotted as a function of the structures of classification system.

The recognition rates of advance models using a two-stage classification scheme with the one based on a flat structure where the input sound is directly assigned to one of the five types are compared. FIG. 6 shows error rates each plotted as a function of the structures of classification system. The performance is evaluated over a hierarchy structure and a flat structure. A low level feature set is used with both structures. For each case the low level features are employed in the feature selection process and the lowest error rate are presented. It seems that the flat classification scheme has a slight advantage over the two-stage one, at the expense of the flexibility and computational complexity.

A number of experiments are conducted to assess the impact of classifiers, feature sets and number of features on the performances of a classification system, where five sound classes, "speech", "music", "machine noise", "wind noise" and "others", are distinguished. The results show that compared with a Gaussian classifier, advanced models, such as GMM or HMM, significantly improves the classification performance. The use of the advanced classifiers is not necessarily associated with a great increase of computational complexity, as one may expect. As for the choice of feature set, the performance of low-level-based classification is comparable with MFCC-based classification. Considering that the computational cost of low level features is generally lower than MFCC, the low level feature set should be recommended when the computational resource is limited. In addition, the number of features is suggested as 5 to 7 to balance the performance and computational cost. The classification performance can be further improved by using longer test sequence or a flat classification scheme.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled, The following documents, which are referred to in the discussion above, are each incorporated by reference in its entirety:

REFERENCES

[1] Kates, J. M., Classification of background noises for hearing aid applications. *The Journal of the Acoustical Society of America,* 1995. 97: p. 461.

[2] Lavner, Y. and D. Ruinskiy, A Decision-Tree based Algorithm for Speech/Music Classification and Segmentation. *EURASIP Journal on Audio, Speech, and Music Processing,* 2009. 2009.

[3] Scheirer, E. and M. Slaney. Construction and evaluation of a robust multifeature speech/music discriminator. in *Proceedings of IEEE International Conference on Acoustics, Speech, and Signal Processing.* 1997, pp. 1331-1334.

[4] Chu, S., S. Narayanan, and C. C. J. Kuo. Environmental sound recognition using MP-based features. in *Proceedings of IEEE International Conference on Acoustics, Speech, and Signal Processing.* 2008, pp. 1-4.

[5] Huang, R. and J. H. L. Hansen, Advances in unsupervised audio classification and segmentation for the broadcast news and NGSW corpora. *IEEE Transactions on Audio, Speech, and Language Processing,* 2006. 14(3): pp. 907-919.

[6] Zhang, T. and C. C. J. Kuo, Audio content analysis for online audiovisual data segmentation and classification. *IEEE Transactions on Speech and Audio Processing,* 2001. 9(4): p. 441.

[7] Edwards, B. W., Z. Hou, C. J. Struck, and P. Dharan, Signal-processing algorithms for a new software-based, digital hearing device. *Hearing Journal,* 1998. 51: pp. 44-54.

[8] McKinney, M. F. and J. Breebaart. Features for audio and music classification. in *Proceedings of International Conference on Music Information Retrieval* 2003, pp. 151-158.

[9] Quatieri, T. F., Discrete-time speech signal processing. 2002: Prentice Hall PTR.

[10] Martin, R. and A. Nagathil. Cepstral modulation ratio regression (CMRARE) parameters for audio signal analysis and classification. in *Proceedings of IEEE International Conference on Acoustics, Speech, and Signal Processing.* 2009, pp. 321-324.

[11] Buchler, M., S. Allegro, S. Launer, and N. Dillier, Sound classification in hearing aids inspired by auditory scene analysis. *EURASIP Journal on Applied Signal Processing,* 2005. 18: pp. 2991-3002.

[12] Blum, A. L. and P. Langley, Selection of relevant features and examples in machine learning. *Artificial intelligence,* 1997. 97(1-2): pp. 245-271.
[13] Duda, R. O., P. E. Hart, and D. G. Stork, Pattern classification. 2001: Wiley New York.
[14] Rabiner, L. R., A tutorial on hidden Markov models and selected applications in speech recognition. *Proceedings of the IEEE,* 1989. 77(2): pp. 257-286.

What is claimed is:

1. A hearing aid, comprising:
a microphone configured to sense an environmental sound; and
a processor including a sound classification module coupled to the microphone and configured to classify the sound by executing a classification algorithm, the processor configured to process the sound using an outcome of the classification of the sound for specified hearing assistance functions, the sound classification module configured to classify sound from the microphone using an environment classification scheme of two sequential stages having classifiers chosen from classifiers that use a Gaussian Mixture Model, feature sets each specific to a chosen classifier of the classifiers, and features comprising five to seven low level features within each of the feature sets, the classifiers, feature sets, and number of the features within the each of the feature sets selected for each stage to enhance classification performance and reduce associated computational cost, wherein at least some features are identified as features for both stages but are calculated once, such that an overall computational cost for the two stages is less than a direct summation of computational cost over the two stages.

2. The hearing aid of claim 1, wherein the features comprise six low level features.

3. The hearing aid of claim 1, wherein the sound classification module is configured to: classify the sound as one of music, speech, and non-speech; and
classify the sound as one of machine noise, wind noise, and other sounds in response to the sound being classified as the non-speech.

4. The hearing aid of claim 1, wherein:
a first stage of the sound classification module is configured to classify sound from the microphone as one of music, speech, and non-speech; and
a second stage of the sound classification module is configured to classify sound from the microphone as one of machine noise, wind noise, and other sounds.

5. A hearing aid, comprising:
a microphone configured to sense an environmental sound; and
a processor including a sound classification module coupled to the microphone and configured to classify the sound by executing a classification algorithm, the processor configured to process the sound using an outcome of the classification of the sound for specified hearing assistance functions, the sound classification module configured to classify sound from the microphone using an environment classification scheme of two sequential stages having classifiers chosen from classifiers that use a Gaussian Mixture Model, feature sets each specific to a chosen classifier of the classifiers, and features within each of the feature sets, the classifiers, feature sets, and number of the features within the each of the feature sets selected for each stage to enhance classification performance and reduce associated computational cost, wherein at least some features are identified as features for both stages but are calculated once, such that an overall computational cost for the two stages is less than a direct summation of computational cost over the two stages.

6. The hearing aid of claim 5, wherein the sound classification module is configured to classify the sound as one of music, speech, and non-speech.

7. The hearing aid of claim 6, wherein the sound classification module is configured to further classify the sound as one of machine noise, wind noise, and other sounds in response to the sound being classified as the non-speech.

8. The hearing aid of claim 5, wherein the feature set comprises six features.

9. The hearing aid of claim 5, wherein the feature set comprises five to seven features.

10. The hearing aid of claim 5, wherein the feature set comprises low level features.

11. The hearing aid of claim 5, wherein the feature set comprises five to seven Mel-scale Frequency cepstral coefficients (MFCC).

12. A method for operating a hearing aid including a microphone and a processor, the method comprising:
sensing an environmental sound using the microphone;
classifying the sound using the processor by executing a classification algorithm including two sequential stages each having classifiers chosen from classifiers that use a Gaussian Mixture Model, feature sets each specific to a chosen classifier of the classifiers, and features within each of the feature sets, the classifiers, feature sets, and number of the features within the each of the feature sets selected for each stage to enhance classification performance and reduce associated computational cost, wherein at least some features are identified as features for both stages but are calculated once, such that an overall computational cost for the two stages is less than a direct summation of computational cost over the two stages; and
processing the sound using an outcome of the classification of the sound for specified hearing assistance functions.

13. The method of claim 12, wherein the features comprise five to seven low level features.

14. The method of claim 12, wherein the features comprise five to seven Mel-scale Frequency cepstral coefficients (MFCC).

15. The method of claim 12, wherein classifying the sound comprises:
classifying the sound as one of music, speech, and non-speech; and
classify the sound as one of machine noise, wind noise, and other sounds in response to the sound being classified as the non-speech.

16. The method of claim 12, wherein classifying the sound comprises:
classifying the sound as one of music, speech, and non-speech via a first stage; and
classifying the sound as one of machine noise, wind noise, and other sounds via a second stage.

17. The method of claim 12, comprising selecting the advanced classification algorithm based on performance and computational cost for the classifying the sound.

18. The method of claim 17, further comprising selecting a feature set for classifying the sound based on the performance and computational cost for the classifying the sound.

19. The method of claim 18, further comprising selecting a number of features in the feature set based on the performance and computational cost for the classifying the sound.

20. The method of claim 19, wherein selecting the number of features in the feature set comprises selecting five to seven features.

21. The method of claim 20, wherein selecting the number of features in the feature set comprises selecting low level features.

\* \* \* \* \*